United States Patent [19]

Takahashi et al.

[11] Patent Number: 4,515,446

[45] Date of Patent: May 7, 1985

[54] ZOOM OBJECTIVE

[75] Inventors: Sadatoshi Takahashi, Tokyo; Sadahiko Tsuji, Kanagawa; Akira Tajima, Kanagawa; Toshiaki Asano, Kanagawa; Setsuo Minami, Kanagawa, all of Japan

[73] Assignee: Canon Kabushiki Kaisha, Tokyo, Japan

[21] Appl. No.: 452,122

[22] Filed: Dec. 22, 1982

[30] Foreign Application Priority Data

Dec. 29, 1981 [JP] Japan .................. 56-212994

[51] Int. Cl.³ .................................... G02B 15/16
[52] U.S. Cl. .................................... 350/427
[58] Field of Search .................... 350/423, 427

[56] References Cited

U.S. PATENT DOCUMENTS 4,240,700 12/1980 Ogawa et al. ................ 350/423

FOREIGN PATENT DOCUMENTS 1404284 5/1965 France ................ 350/427
169716 10/1982 Japan ................ 350/423

Primary Examiner—John K. Corbin
Assistant Examiner—Scott J. Sugarman
Attorney, Agent, or Firm—Toren, McGeady, Stanger, Goldberg & Kiel

[57] ABSTRACT

A zoom objective comprising four lens groups of which the first three lens groups counting from the object side are movable for zooming, whereby the refractive powers and the conditions of zooming movement of the aforesaid three lens groups are properly specified so as to improve the compactness while still maintaining good correction of aberrations.

5 Claims, 19 Drawing Figures

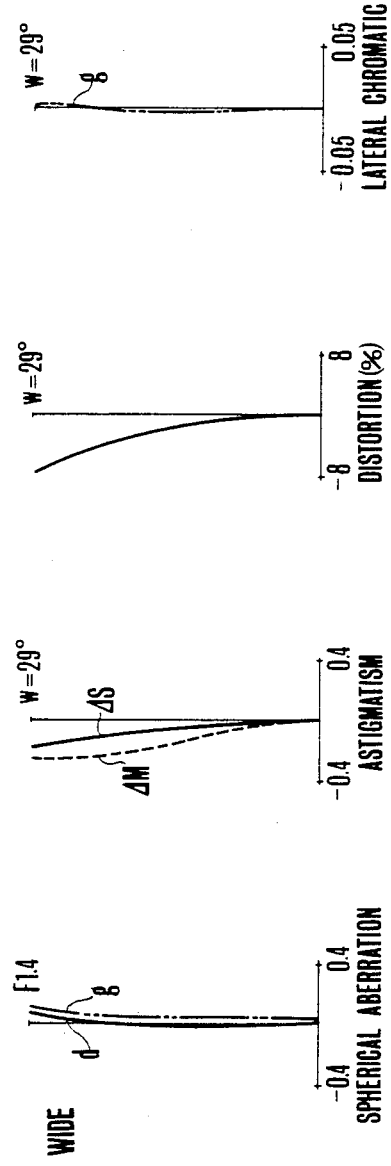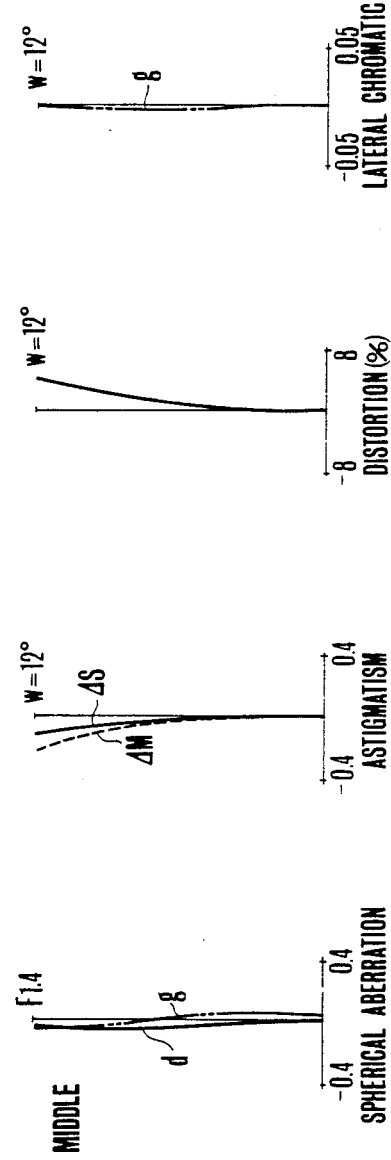

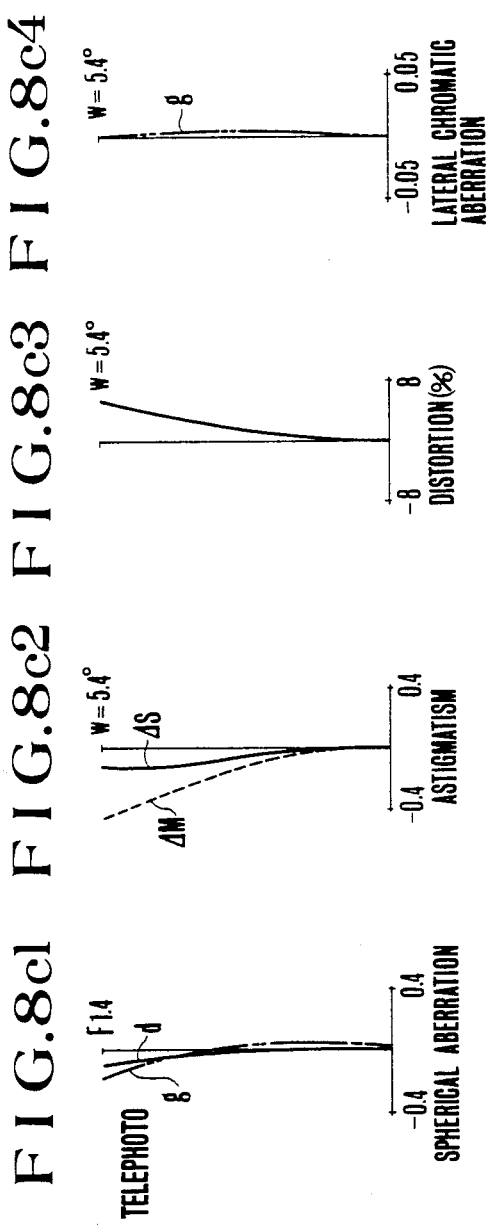

ZOOM OBJECTIVE

BACKGROUND OF THE INVENTION

1. Field of the Invention

This invention relates to zoom objectives, and, more particularly, to compact zoom objectives suited (to photographic optical systems) for still cameras, 8 m/m cine cameras, video cameras, etc.

2. Description of the Prior Art

In the past, there have been many proposals for zoom objectives composed of four lens components (or groups), or so-called 4-component zoom objectives. This 4-component zoom objective is generally composed of the 1st lens component counting from the object side and is stationary during zooming and axially movable for focusing; the 2nd component is axially movable for varying the overall focal length; the 3rd component is axially movable for compensating the image shift resulting from the movement of the 2nd component; and the 4th component is stationary during zooming and forms an image of magnification satisfying the overall focal length. In such a type of zoom objective, the 2nd lens component mainly performs the magnification varying effect. Since the total zooming movement is determined by the focal length of the 2nd lens component, therefore, the increase in the zooming ratio calls for an increase of the total movement of the 2nd lens component. For this reason, a large space for the movement of 2nd and 3rd lens components is required, thus producing a drawback that the total length of the lens system is unavoidably increased. Another drawback of the zoom objective of the type described is that, as the zoom ratio increases, the physical dimensions of any part of the overall lens system must be increased.

Attempts have been made to improve these drawbacks so that it is possible to design a zoom objective of an increased zoom ratio while still permitting a minimization of the bulk and size of the entire lens system by means such as disclosed in Japanese Patent Publication No. Sho 41-13667 (U.S. Pat. No. 3,481,666). According to this prior art, the lens system comprises, from front to rear, a 1st lens group of positive power, a 2nd lens group of negative power, a 3rd lens group of positive power and a 4th lens group of positive or negative power, whereby when zooming from the wide angle to the telephoto position, the 1st and 3rd lens groups move forward as a unit, while the 2nd lens group moves rearward. However, this type of zoom objective becomes impossible to maintain the image plane constant where the image magnification of the 2nd lens group exceeds unity, or the absolute value of image magnification becomes not less than 1, and, therefore, to provide an optical system of constant image plane. This fact has first been found out by the applicant of this patent application. This is the very essential cause which prohibits increase of the zoom ratio of this type of zoom objective and further reduction of the bulk and size of the lens system.

Other zoom objectives comprising four lens groups of which three are moved to effect zooming, include those specified in U.S. Pat. Nos. 4,240,700 and 4,306,776.

SUMMARY OF THE INVENTION

An object of the present invention is to improve the above-described drawbacks of the conventional zoom objective, and to provide a 4-component zoom objective which takes a compact form when in the shortest focal length.

Another object of the present invention is to provide a zoom objective having an extended range with a high relative aperture and all aberrations well corrected for excellent imaging performance over the extended range.

To achieve these objects, according to the present invention, the zoom objective is constructed from a 1st lens group of positive power, a 2nd lens group of negative power, a 3rd lends group of positive power and a 4th lens group of either positive or negative power arranged in this order from front, wherein the aforesaid 1st, 2nd and 3rd lens groups are made movable independently of one another to effect zooming, whereby features of the 2nd lens group are designed so as to allow for the image magnification of the 2nd lens group to vary in a range including that region where the image magnification exceeds unity, in other words, the absolute value of the image magnification is not less than 1. Further in zooming positions for the long focal lengths, the 1st and 3rd lens groups are made to lie farther from the focal plane, and the 2nd lens group to lie nearer thereto than when in zooming positions for the short focal lengths. Thus, a compact, extended-range, high relative aperture zoom objective is achieved.

BRIEF DESCRIPTION OF THE DRAWINGS

FIGS. 8-$a$-1 through 4, 8-$b$-1 through -4 and 8-$c$-1 through 4 are graphic representations of the aberrations of the zoom objective of FIG. 7 in different zooming positions.

DETAILED DESCRIPTION OF THE PREFERRED EMBODIMENTS

The zoom objective of the present invention has four lens components of which the first three components counting from the front are axially movable in different relation to each other where the image magnification of the 2nd lens component include the unity, and that when zoomed from the short to the long focal length position, the 1st and 3rd components move forward and the 2nd component moves in the opposite direction thereby achieving the above-described objects of the invention.

The features of the zoom objective of the invention will next be described. By moving the 1st lens component forward as zooming is performed from the short to the long focal length position, an object point for the 2nd component can be put nearer thereto so that the image magnification changing effect can be increased. Therefore, the total movement of the 2nd lens component itself can be reduced to effect an equivalent result to that attained by a longer movement thereof. Therefore, it becomes possible to reduce the axial air space between the 2nd and 3rd lens components when in zooming positions for the shortest focal lengths. As a result, the total length of the entire lens system in the shortest focal length position can be shortened. Further, the image magnification of the 2nd lens component includes the unity, (larger than the absolute value of the image magnification value $-1$). Therefore remarkable variation of the magnification of the 2nd lens component due to the shift of the object point for the 2nd lens component (the image point of the 1st lens component) as compared with the image magnification of the 2nd lens component below the unity can be obtained. That is, the variation of image magnification of the 2nd lens component across unity makes it possible to obtain a large magnification varying effect by the shorter total movement of the 2nd lens component. According to the prior art, however, as the 1st and 3rd lens components move as a unit, when the 2nd lens component exceeds unity, no solution of the image shift compensating equation is in existence. Unlike this, when the 1st and 3rd lens components are moved in different relation, it is made possible to maintain the constant image plane despite the 2nd lens component is used in excess of unity. Since the magnification varying efficiency of the 2nd and 3rd lens components are made the highest, the total length of the entire system can therefore be reduced remarkably. It is to be noted that the 4th lens component is stationary during zooming, and therefore this invention is effective whether the power of the 4th lens component is positive or negative.

Figure 1:
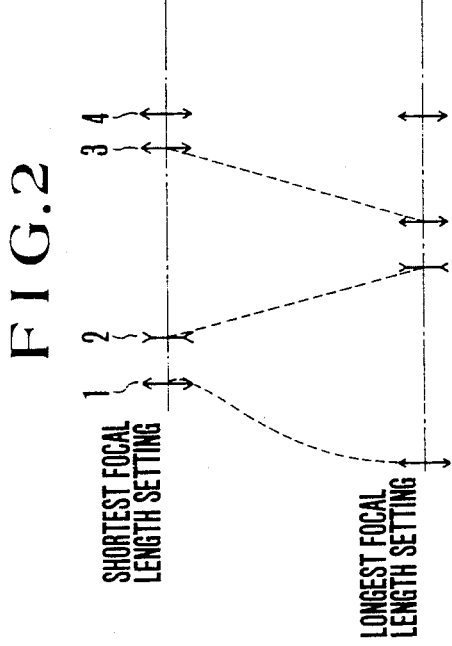
FIGS. 1 through 6 are diagrams illustrating different traces of movement of the zoom objective of the invention respectively.

Next there are illustrated paraxial arrangements according to the present invention. The paraxial arrangement of a 1st embodiment is shown in Table 1, and the locus of zooming movement of each lens component is depicted in FIG. 1. $f_1$ through $f_4$ are the focal lengths of the 1st through 4th lens components respectively, $e_1$ the distance between the principal planes of the 1st and 2nd lens components, $e_2$ the distance between the principal planes of the 2nd and 3rd lens components, $e_3$ the distance between the principal planes of the 3rd and 4th lens components, the numerical data for the shortest and longest focal length positions being given. There are also listed image magnifications $\beta_2$ through $\beta_4$ the 2nd through 4th lens components contribute to a magnification of the entire system for either of the shortest and longest focal lengths. It should be pointed out that the image magnification of the 1st lens component is always zero with respect to an object point at infinity. It is noted from Table 1 that the 2nd and 3rd lens components in use contribute the respective range of magnifications each across units.

TABLE 1

| Focal Length of Entire System | Shortest Focal Length Setting | Longest Focal Length Setting |
|---|---|---|
|  | 11.275 | 64.35 |
| $f_1$ | 63.00 |  |
| $f_2$ | −14.81 |  |
| $f_3$ | 23.85 |  |
| $f_4$ | 37.86 |  |
| $e_1$ | 8.00 | 36.71 |
| $e_2$ | 33.03 | 8.00 |
| $e_3$ | 17.89 | 30.07 |
| $\beta_2$ | −0.368 | −1.289 |
| $\beta_3$ | −0.810 | −1.321 |
| $\beta_4$ | 0.600 | 0.600 | wherein:
f1 through f4 are the focal lengths of the 1st through 4th lens components respectively;
e1 is the distance between the principal planes of the 1st and 2nd lens components;
e2 is the distance between the principal planes of the 2nd and 3rd lens components;
e3 is the distance between the principal planes of the 3rd and 4th lens component; and
β2 through β4 are the image magnifications for the 2nd through 4th lens components.

An example of a specific thick zoom objective having the same zooming locus as that of FIG. 1 can be constructed in accordance with the following numerical data for the radii of curvature, R, the axial thicknesses and air spaces, D, and the refractive indices, N, and Abbe numbers, $\nu$, of the glasses of the respective lens elements with subscripts numbered consecutively from front to rear.

Focal Length: 11.275–64.35 F-number: 1:1.4
Image Angle = 58 – 10.8°

| R1 = 154.762 | D1 = 2.15 | N1 = 1.80518 | $\nu$1 = 25.4 |
| R2 = 49.927 | D2 = 10.50 | N2 = 1.51633 | $\nu$2 = 64.1 |
| R3 = −174.969 | D3 = 0.15 | | |
| R4 = 46.034 | D4 = 6.50 | N3 = 1.69680 | $\nu$3 = 55.5 |
| R5 = 400.457 | D5 = Variable | | |
| R6 = 60.091 | D6 = 1.10 | N4 = 1.77250 | $\nu$4 = 49.6 |
| R7 = 16.952 | D7 = 5.54 | | |
| R8 = −18.446 | D8 = 1.10 | N5 = 1.77250 | $\nu$5 = 49.6 |
| R9 = 27.383 | D9 = 4.00 | N6 = 1.84666 | $\nu$6 = 23.9 |
| R10 = −111.505 | D10 = Variable | | |
| R11 = 209.999 | D11 = 3.00 | N7 = 1.77250 | $\nu$7 = 49.6 |
| R12 = −41.363 | D12 = 0.15 | | |
| R13 = 31.501 | D13 = 4.20 | N8 = 1.78590 | $\nu$8 = 44.2 |
| R14 = −62.815 | D14 = 1.00 | N9 = 1.84666 | $\nu$9 = 23.9 |
| R15 = 173.867 | D15 = Variable | | |
| R16 = 0.0 | D16 = 1.00 | | |
| R17 = 14.799 | D17 = 2.20 | N10 = 1.65160 | $\nu$10 = 58.6 |
| R18 = 19.175 | D18 = 0.15 | | |
| R19 = 9.781 | D19 = 2.20 | N11 = 1.60311 | $\nu$11 = 60.7 |
| R20 = 17.041 | D20 = 1.50 | | |
| R21 = 51.584 | D21 = 1.00 | N12 = 1.84666 | $\nu$12 = 23.9 |
| R22 = 8.196 | D22 = 5.04 | | |
| R23 = 31.529 | D23 = 0.80 | N13 = 1.60342 | $\nu$13 = 38.0 |
| R24 = 14.583 | D24 = 3.00 | N14 = 1.66672 | $\nu$14 = 48.3 |
| R25 = −19.379 | | | |

Thick Lens Separations during Zooming with Object at Infinity

| Focal Length | D5 | D10 | D15 |
|---|---|---|---|
| 11.275 | 0.664 | 26.005 | 1.00 |
| 29.66 | 20.758 | 13.492 | 7.091 |
| 64.35 | 29.372 | 0.980 | 13.182 |

Figure 7:
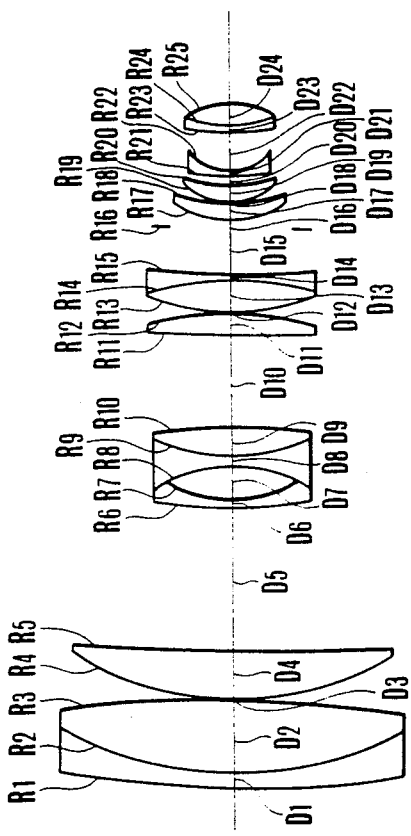
FIG. 7 is a longitudinal section of an embodiment of a zoom objective according to the present invention.

In FIG. 7, there is illustrated a sectional view of this specific zoom objective in the intermediate focal length position. Further, the aberrations are shown in FIGS. 8-a-1 through 4, FIGS. 8-b-1 through 4 and FIGS. 8-c-1 through 4 where (a) designates the shortest focal length position, (b) the intermediate focal length position and (c) the longest focal length position. In this specific embodiment, the total optical length when in the shortest focal length setting is 95.0 mm, and when in the longest focal length setting, 108.7 mm, and the telephoto ratio is 1.47. The term "total optical length" herein used means the distance from the front vertex of the lens system to the image plane, and the term "telephoto ratio" means the value obtained by dividing the smallest total optical length by the longest focal length. Unlike this, the lens system disclosed in Japanese Pat. No. Sho 41-13667, has the total optical lengths of 103.86 mm in the shortest focal length setting and 116.63 mm in the longest focal length setting with the telephoto ratio of 2.29. It is evident from comparison with this conventional numerical example that the present invention has achieved a valuable reduction in the size of the zoom objective.

Figure 2:
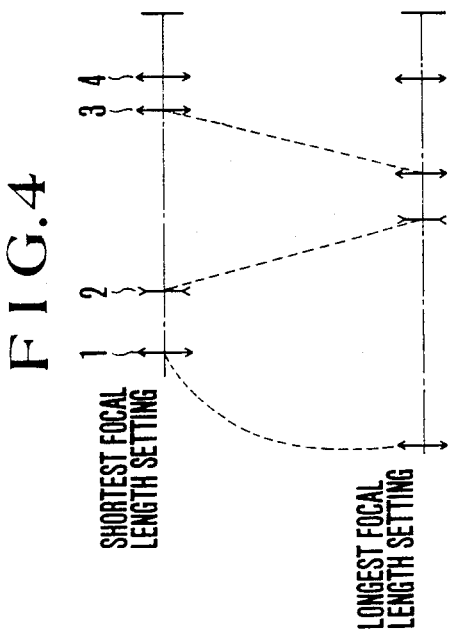

Table 2 shows the paraxial arrangement of the 2nd embodiment, and the locus of zooming movement of each component is illustrated in FIG. 2. It is noticed that as illustrated in FIG. 2, when zooming from the shortest focal length position, the 1st lens component at first moves slightly toward the rear and then moves toward the front.

TABLE 2

| Focal Length of Entire System | Shortest Focal Length Setting | Longest Focal Length Setting |
|---|---|---|
|  | 11.00 | 66.0 |
| $f_1$ | 60.00 |  |
| $f_2$ | −14.00 |  |
| $f_3$ | 21.99 |  |
| $f_4$ | 74.04 |  |
| $e_1$ | 8.00 | 34.48 |
| $e_2$ | 33.80 | 8.00 |
| $e_3$ | 6.00 | 18.77 |
| $\beta_2$ | −0.368 | −1.216 |
| $\beta_3$ | −0.710 | −1.291 |
| $\beta_4$ | 0.701 | 0.701 | wherein:
f1 through f4 are the focal lengths of the 1st through 4th lens components respectively;
e1 is the distance between the principal planes of the 1st and 2nd lens components;
e2 is the distance between the principal planes of the 2nd and 3rd lens components;
e3 is the distance between the principal planes of the 3rd and 4th lens component; and
β2 through β4 are the image agnifications for the 2d through 4th lens components.

Figure 3:
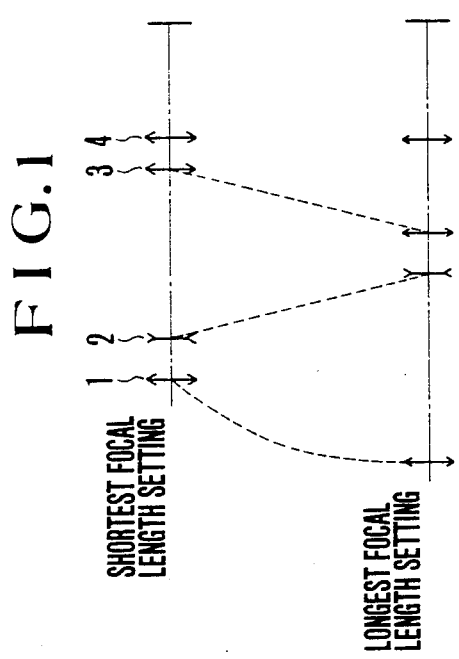

The 3rd embodiment has the paraxial arrangement shown in Table 3 below and the locus of movement of each component illustrated in FIG. 3. In this embodiment, the image magnification of the 3rd lens component is used within the limitation not exceeding unity. The 1st lens component moves most forward when zoomed to intermediate positions, and then moves rearward to a farther position for the longest focal length than that for the shortest focal length. Such positioning of the 1st lens component for the longest focal length contributes to an improvement of the magnification changing effect of the 2nd lens component.

TABLE 3

| Focal Length of Entire System | Shortest Focal Length Setting | Longest Focal Length Setting |
|---|---|---|
|  | 11.00 | 66.0 |
| $f_1$ | 60.00 |  |
| $f_2$ | −14.00 |  |
| $f_3$ | 21.99 |  |
| $f_4$ | 74.04 |  |
| $e_1$ | 8.00 | 37.16 |
| $e_2$ | 33.79 | 8.00 |
| $e_3$ | 6.00 | 12.17 |
| $\beta_2$ | −0.368 | −1.584 |
| $\beta_3$ | −0.710 | −0.991 |
| $\beta_4$ | 0.701 | 0.701 | wherein:
f1 through f4 are the focal lengths of the 1st through 4th lens components respectively;
e1 is the distance between the principal planes of the 1st and 2nd lens components;
e2 is the distance between the principal planes of the 2nd and 3rd lens components;
e3 is the distance between the principal planes of the 3rd and 4th lens component; and
β2 through β4 are the image magnifications for the 2d through 4th lens components.

Figure 4:
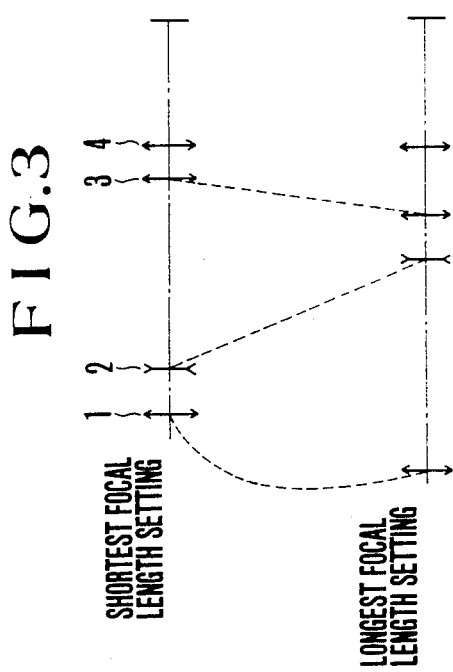

The 4th embodiment has the paraxial arrangement shown in Table 4 below with the locus of movement of each component in FIG. 4. In this embodiment, the image magnification of the 3rd lens component is used in a range exceeding unity.

TABLE 4

| Focal Length of Entire System | Shortest Focal Length Setting | Longest Focal Length Setting |
|---|---|---|
|  | 11.00 | 66.0 |
| $f_1$ | 63.00 |  |
| $f_2$ | −14.00 |  |
| $f_3$ | 25.79 |  |
| $f_4$ | 40.52 |  |
| $e_1$ | 11.00 | 39.95 |
| $e_2$ | 32.17 | 8.00 |
| $e_3$ | 6.00 | 17.16 |
| $\beta_2$ | −0.368 | −1.547 |

TABLE 4-continued

| Focal Length of Entire System | Shortest Focal Length Setting | Longest Focal Length Setting |
|---|---|---|
| $\beta_3$ | −1.01 | −1.443 |
| $\beta_4$ | 0.469 | 0.469 | wherein:
f1 through f4 are the focal lengths of the 1st through 4th lens components respectively;
e1 is the distance between the principal planes of the 1st and 2nd lens components;
e2 is the distance between the principal planes of the 2nd and 3rd lens components;
e3 is the distance between the principal planes of the 3rd and 4th lens component; and
β2 through β4 are the image magnifications for the 2d through 4th lens components.

Figure 5:
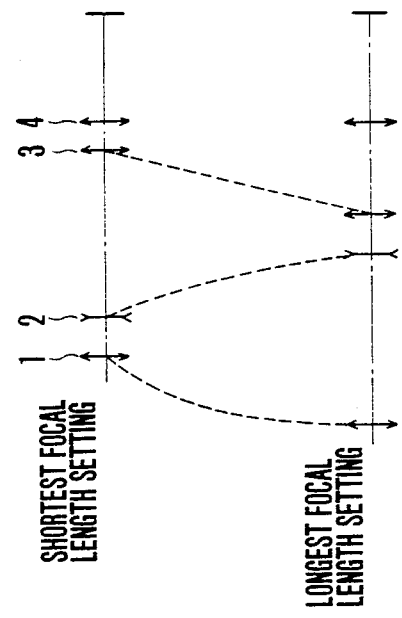

The paraxial arrangement of the 5th embodiment is shown in Table 5 with the locus of movement of each component in FIG. 5. This embodiment is adapted to have the 4th lens component of negative power. It is also to be noted that the 3rd lens component is non-linearly moved to play a role of serving as the compensator for maintaining the constant image plane. The 3rd lens component is most forward toward the object when in the intermediate focal length positions, and more rearward toward the image when in the longest focal length position than that when in the intermediate positions. But, the positioning of the 3rd lens component more forward when in the longest focal length setting than when in the shortest one heightens the magnification changing effect.

TABLE 5

| Focal Length of Entire System | Shortest Focal Length Setting | Longest Focal Length Setting |
|---|---|---|
|  | 11.0 | 66.7 |
| $f_1$ | 66.0 |  |
| $f_2$ | −13.34 |  |
| $f_3$ | 13.44 |  |
| $f_4$ | −45.57 |  |
| $e_1$ | 8.00 | 40.72 |
| $e_2$ | 29.64 | 5.87 |
| $e_3$ | 6.00 | 9.35 |
| $\beta_2$ | −0.299 | −1.117 |
| $\beta_3$ | −0.401 | −0.650 |
| $\beta_4$ | 1.392 | 1.392 | wherein:
f1 through f4 are the focal lengths of the 1st through 4th lens components respectively;
e1 is the distance between the principal planes of the 1st and 2nd lens components;
e2 is the distance between the principal planes of the 2nd and 3rd lens components;
e3 is the distance between the principal planes of the 3rd and 4th lens component; and
β2 through β4 are the image magnifications for the 2d through 4th lens components.

Figure 6:
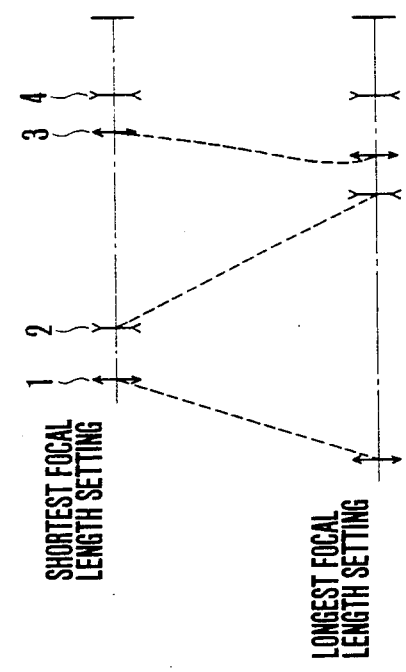

Though the foregoing embodiments each have been represented in such form that either one of the 1st through 3rd lens components is non-linearized, it is also possible to non-linearize the locus of movement of two or all of them. The latter will be put into practice in the view point that the cam shape is more smoothed, and a naturalness of the magnification changing effect is obtained. A practical example of the locus of movement of this zoom lens is illustrated in FIG. 6. The lens components in the zoom lens of FIG. 6 are given exactly the same powers as those shown in FIG. 2. When zooming from the shortest to the longest focal length position, the 1st lens component moves monotonously forward non-linearly the 2nd lens component moves monotonously rearward non-linearly, and the 3rd lens component moves monotonously forward linearly.

What we claim:

1. A zoom objective comprising:
   from front to rear, a first positive lens component, a second negative lens component, a third positive lens component and a fourth lens component;

said first, second and third lens components moving independently of one another when zooming, and said fourth lens component being held stationary during zooming;

said first and third lens components lying more toward the front when in the telephoto side than when in the wide angle side, and said second lens component lying more toward the rear when in the telephoto side than when in the wide angle side; and said second lens component being arranged to move in such a way that its magnification power varies to exceed unity.

2. A zoom objective according to claim 1, wherein said first lens component moves first toward the front and then toward the rear as zooming is being performed from the wide angle to the telephoto position.

3. A zoom objective according to claim 1, wherein said first lens component takes the frontmost position at an intermediate point in the zooming range.

4. A zoom objective according to claim 1, wherein said third lens component takes the frontmost position at an intermediate point in the zooming range.

5. A zoom objective according to claim 4, wherein said fourth lens component has a negative refractive power.

* * * * *